Sept. 16, 1958  M. F. KOLLMANN  2,851,782
VALVE GUIDE WEAR GAGE

Filed July 9, 1953  3 Sheets-Sheet 1

INVENTOR.
MELVIN F. KOLLMANN
BY Jerome P. Bloom
Wade Koontz and
ATTORNEYS

Sept. 16, 1958　　　M. F. KOLLMANN　　　2,851,782
VALVE GUIDE WEAR GAGE

Filed July 9, 1953　　　　　　　　　　　　3 Sheets-Sheet 2

INVENTOR.
MELVIN F. KOLLMANN
BY
ATTORNEYS

р

United States Patent Office 2,851,782
Patented Sept. 16, 1958

2,851,782

VALVE GUIDE WEAR GAGE

Melvin F. Kollmann, Dayton, Ohio

Application July 9, 1953, Serial No. 367,121

7 Claims. (Cl. 33—172)

(Granted under Title 35, U. S. Code (1952), sec. 266)

The invention described herein may be manufactured and used by or for the Government for governmental purposes without payment to me of any royalty thereon.

This invention is directed to an improved valve guide wear testing device or instrument to determine the amount of valve guide wear by showing in a practical manner the degree of looseness of a valve stem in its guide. Previous means applied to check valve guide wear have proven to lend themselves to inaccuracies and lack the precision accomplishment of the improved device which is the subject of this invention.

The invention in the practical embodiment described herein consists of a supporting base or bracket for attachment to the top of a valve rocker box or valve housing of an engine and includes thereon a valve unseating screw stem arranged to depress the end of a valve stem to push the valve off of its seat and a pivoted fork unit or rocker to shift the valve stem laterally to determine the degree of looseness of the valve stem in the valve guide, and also includes an indicator to show the degree of relative displacement of the valve stem in its guide as the stem is moved laterally by the fork or rocker unit.

An object of this invention is to provide a new and improved guide valve wear indicating instrument.

A further object of the invention is to provide improved testing apparatus for determining the amount of play of a valve stem in its valve guide.

An additional object of the invention is to provide an improved precision wear indicating instrument for checking the valve guide wear without need for disassembling of the valve unit from the engine.

Other objects and advantages of the invention will become readily apparent to those versed in the art from the following specification taken in conjunction with their accompanying drawings wherein.

Figure 1:
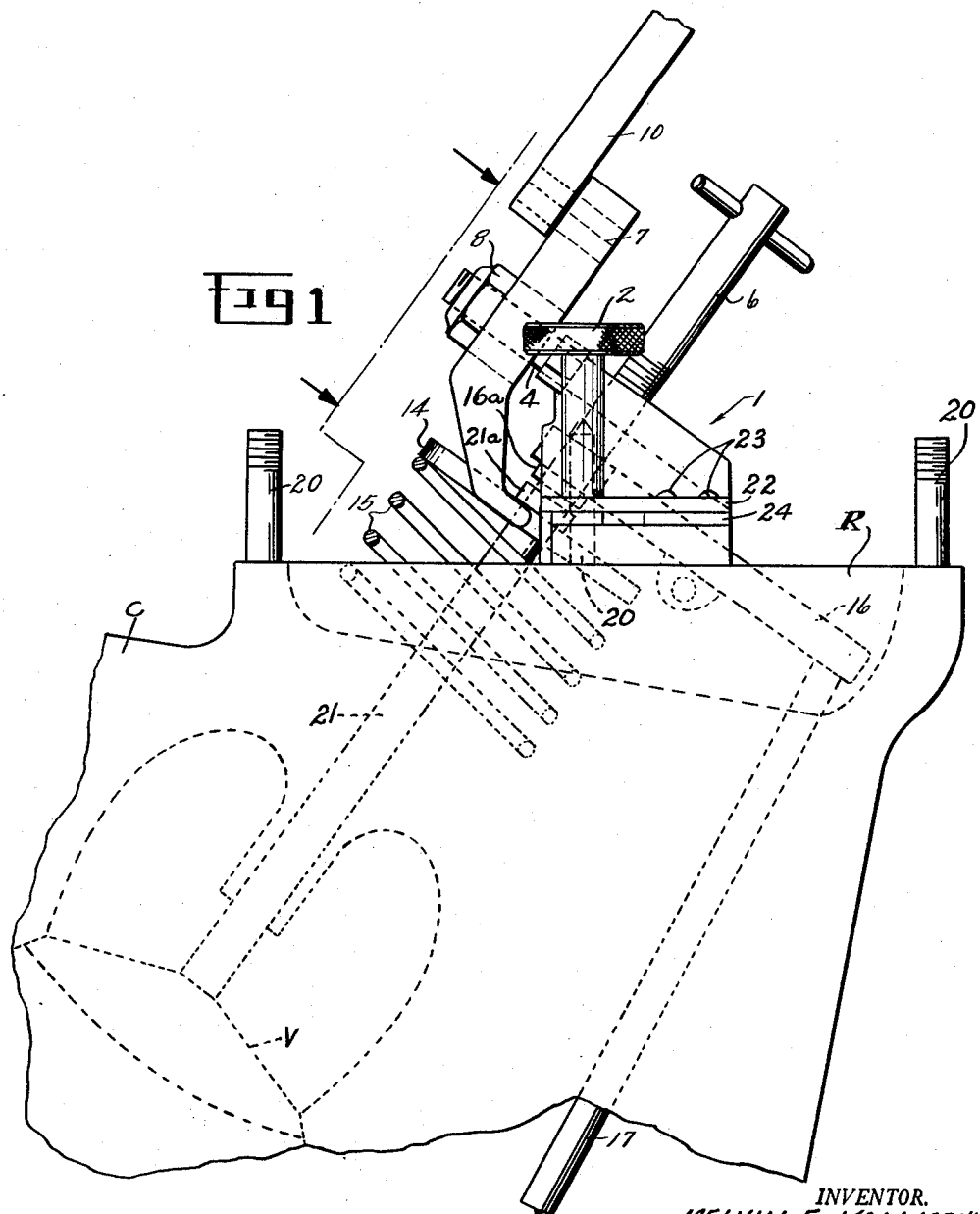
Figure 1 is a fragmentary view of an engine showing the invention in its application to a valve in an aircraft engine, but with the wear indicator gage unit removed.
Figure 2:
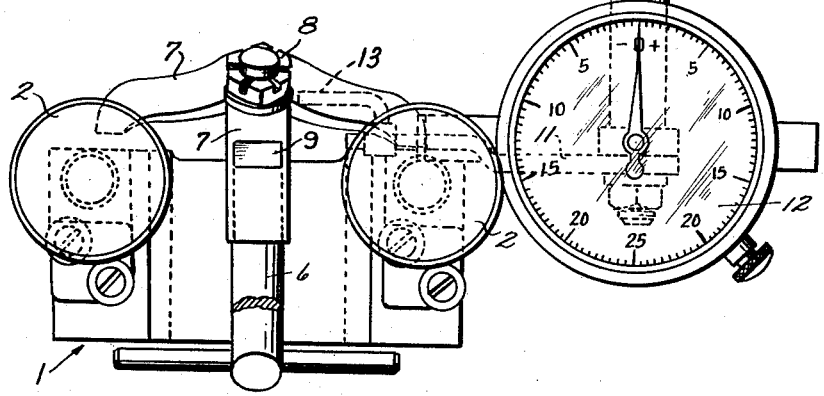
Figure 2 shows a plan view of the novel test device shown in Figure 1 and showing the wear indicator gage unit attached.
Figure 3:
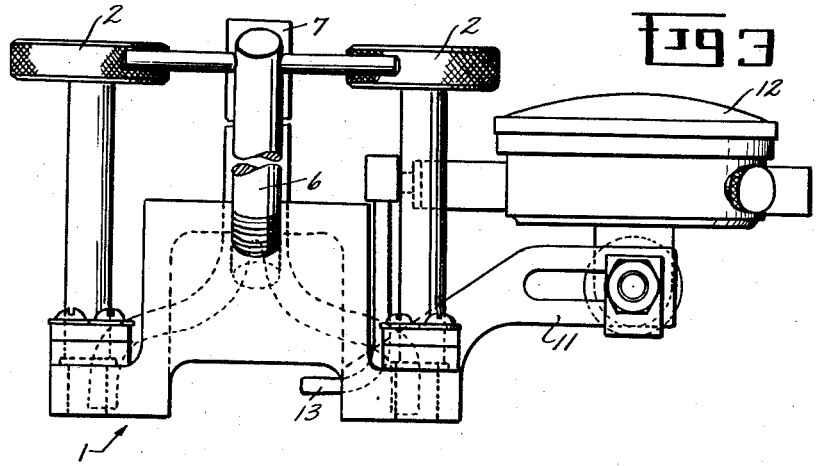
Figure 3 shows a side elevation of the invention structure taken perpendicular to Figure 2.
Figure 4:
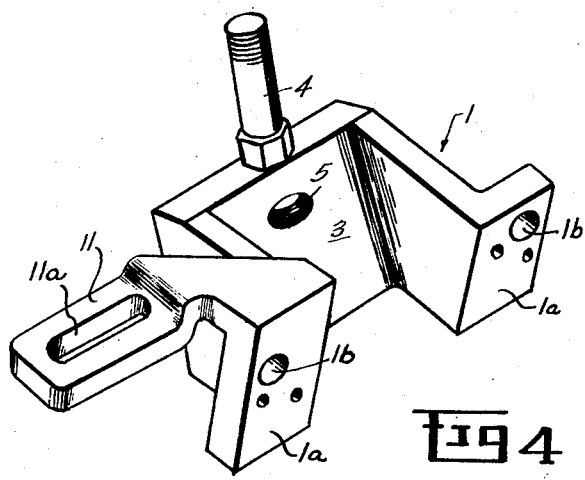
Figure 5:
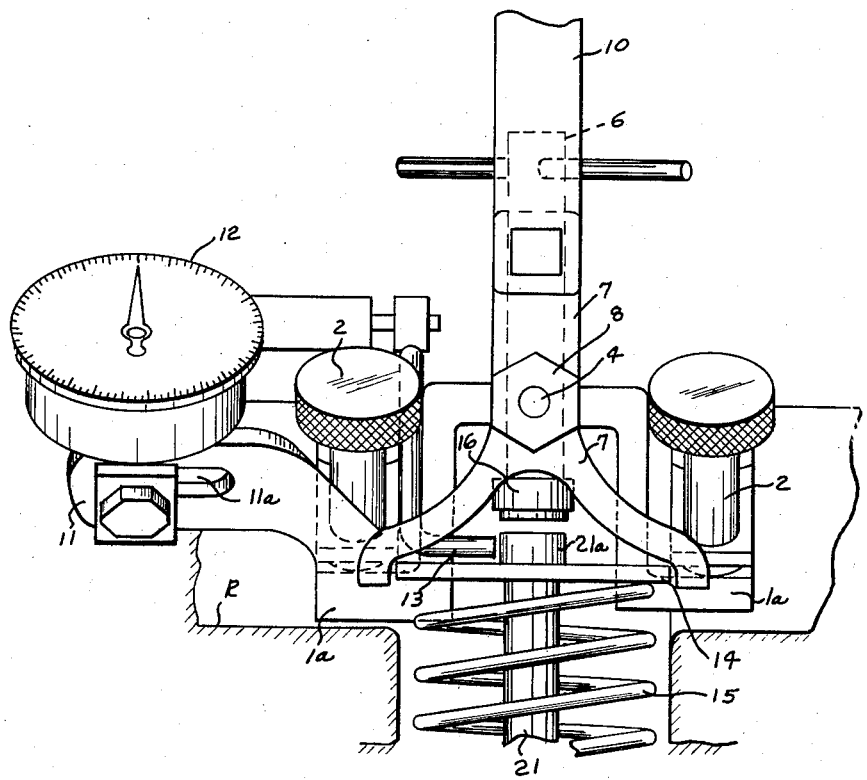

Figure 4 is a perspective view of the supporting bracket per se, looking toward the bottom or lower supporting surface thereof; and Figure 5 is a fragmentary view showing the valve guide wear indicating instrument applied to the rocker box of an engine with the rocker box partly sectioned, looking in the direction opposite from Figure 3 and viewed in the direction indicated by arrows 5—5 in Figure 1.

Referring to Figure 1, C indicates an upper portion of an engine cylinder block with an integral valve rocker box R from which the cover has been removed. When the cover is in place it is bolted to the top, flat surface of box R by conventional means including threaded studs 20 and nuts. If it is desired to test the degree of wear between the stem 21 of a valve V of the engine and its valve stem guide 33 in the rocker box R, the cover is removed and the valve guide wear indicating instrument is secured to the top of the rocker box R during valve guide wear testing.

As seen in the drawings the valve guide wear indicating device or instrument, in the preferred embodiment, consists of a supporting base or bracket 1 with a pair of feet 1a having a supported lower surface 25 adapted to rest on the flat top surface 32 of the rocker box R, see Figure 1. Rotatably mounted on each foot 1a is an internally threaded knurled headed screw sleeve 2. As shown in Figure 1 a plate 22 is fastened by screw securing means such as screws 23 to each of the feet 1a. The plates 22 are each provided with a hole 29 sized to accommodate the screw sleeves 2 with a loose fit. The screw sleeves 2 each have an external collar or flange 31 at their lower ends disposed between the plates 22 and the feet 1a. The spacer plates or elements 24, positioned between each plate 22 and foot 1a, provide space sufficient to accommodate the external collar or flange 31. This structure rotatably secures each sleeve 2 to one of the supporting bracket feet 1a. Holes 1b are formed in the supporting feet 1a of the bracket and are spaced apart to receive therethrough two of the conventional studs 20 rising from the top surface of the rocker box R, as seen dotted in Figures 1 and 5. The spacer plates 22 are made so that each hole 29 is coaxial with the holes 1b in the feet 1a of the bracket 1, permitting the two studs 20 to pass through both the feet 1a and plates 22 and into the threaded interior of the screw sleeves which are dimensioned to accommodate them so as to attach the wear guide testing device to the rocker box R so that a pair of the studs 20 can be threaded through the interior of the screw sleeves 2. Then the screw sleeves 2 are rotated to screw them onto the studs until the bottom surfaces 25 of the bracket feet 1a are clamped firmly on top of the rocker box R.

The bracket 1 has a central portion 3 located between the feet 1a which extends at an angle of approximately 35° to the plane of the bottom 25 of the bracket feet 1a. This inclined central portion 3 has an outwardly projecting stud or pivot shaft 4 and a threaded opening 5 through the inclined portion 3 located below the stud 4 and perpendicular thereto. An abutment screw member 6 is threaded in the opening 5 and extends therethrough. Pivotally mounted on the inclined pivot shaft 4 is a fork member or bifurcated rocker arm 7 having two fingers or tines spaced apart a distance substantially equal to the diameter of a spring abutment or spring seat plate flange 14, which has a spring 15 abutting thereagainst to normally maintain the valve V in a closed position, on the valve stem 21. This fork member 7 is restrained from removal off of the free end of the stud or pivot shaft 4 by a nut 8 which is threaded on the end of shaft 4. A non-circular opening 9, such as a square hole, is formed in the handle of the fork member 7, to which is connected a tilting lever or wrench handle 10. The handle member 10, which fits the opening 9, may be grasped to apply increased leverage to the fork member 7 to pivot or rock the fork member about the axis of the stud 4. The bracket 1 has a slotted lateral arm 11 disposed perpendicular to the base or bottom surface 25 of the feet 1a.

Mounted on the slotted extension 11 is an indicating unit or instrument including a dial indicator or gage 12, such as a conventional dial micrometer, for example, having a supporting lug or arm depending from the back or bottom of the case of the gage. A knurled-headed clamping screw 27 is formed with a threaded end of reduced diameter which passes freely through a hole, provided in the lug or arm 26 and through the slot 11a in the extension 11, see Figures 3 and 5. The reduced threaded end of the screw 27 is threaded to receive a clamping nut 28. By loosening the clamping screw 27, the indicator or gage 12 is made free for sliding adjustment along the slot 11a. The clamping screw 27 may be then tightened to secure the gage in a desired adjusted position. The indicator or gage 12 has an actuating feeler arm 13 arranged to contact the side of the valve stem 21 in the rocker box R to which the instrument is applied and thus transmits sidewise displacement of the valve stem 21 to the indicating pointer of the gage 12.

In practice, as shown in Figure 1 of the drawings, the valve, in the rocker box R to which the indicating unit is applied, has a valve head V at the lower end of the valve stem 21. The valve stem 21, as shown in Figure 1, is inclined upwardly at an angle of approximately 35° past the top surface 32 of the rocker box R and extends through the disk or spring seat plate 14 and terminates in a shoulder or collar 21a abutting the top surface of the spring seat plate 14. Associated with the valve stem 21 is a conventional valve rocker arm 16, which is pivoted in the rocker box R in the conventional manner and operable to open the valve V by the usual valve actuating push rod 17. In overhauling and checking an engine, it is necessary to determine accurately the degree of wobble or play that exists between the valve stem 21 of the engine and its valve guide 33. To provide a true test of this looseness the valve should be moved slightly off of its valve seat.

With my improved test device secured to the top surface of the rocker box on the studs 20 by the internally threaded knurled sleeves 2, the lower end of the screw member 6 will be directly above the valve stem engaging end of the rocker arm 16 and the shoulder or collar 21a on the valve stem 21 and the tines on the fork members 7 will straddle the diametrically opposite sides of the spring seat plate 14. Also, as best seen in Figure 5, the feeler arm 13 of the indicator or gage 12 will be disposed against the side of the shoulder or collar 21a at the top end of the valve stem 21, in a juxtaposed position to test wear between the guide stem 21 and the valve guide 33 in the rocker box when the valve stem is rocked or wobbled laterally.

Then the adjustment screw member 6 is rotated in its threaded hole 5 to cause it to engage the valve stem engaging end of the valve actuating rocker arm 16 to open or unseat the valve slightly. Leverage is then applied through the handle 10 to the bifurcated fork member 7 to rock or pivot it sidewise about the inclined pivot shaft or stem 4. This movement will cause it to engage the valve spring seat 14 at opposite sides and wobble or rock the valve stem laterally in its valve guide 33.

In application for testing, the fork member 7 is rocked or pivoted as far as possible in one direction and held there, while the dial indicator or gage 12 is adjusted along the slot 11a, as permitted by the means previously described, including the clamping screw 27, without change in the zero setting of the dial indicator until the feeler 13 contacts the side of the end 21a of the valve stem. Then the fork member 7 is rocked as far as possible in the opposite direction and the indicator or gage will then show the exact amount of lateral displacement or looseness of the valve stem in its valve guide. Accordingly, the degree or amount of guide wear may be readily determined with a minimum of delay and inconvenience. The invention takes all of the guesswork out of checking valve guide wear and enables a substantial reduction in time for inspection of valve guide wear in engines with a high degree of accuracy in determining the degree of valve guide wear and the degree of looseness of a valve stem in its valve guide without removal or disassembling of the valve unit.

It is noted that my novel testing device, which is the subject of my invention, permits more accurate and expeditious engine inspection particularly in aircraft engines and eliminates unwarranted change and overhaul of engines and engine cylinders where the change may otherwise be believed to be warranted due to an assumed valve guide wear.

While a specific practical embodiment of the invention is set forth therein, such is only illustrative, and many modifications and various applications may be made such as will be readily apparent to those versed in the art or within the scope of the invention as defined by the claims herein.

What I claim is:

1. A device for measuring the wear of a valve guide having a valve stem of a valve, which is disposed in a housing, extending therethrough, said device comprising support means mounted on the valve housing, means movable through the support means to unseat the valve, means mounted on said support means to move the valve stem laterally in its valve guide, and indicating means mounted on said support means and responsive to the lateral movement of the valve stem in its valve guide by said valve stem moving means to indicate the wobble or play of the valve stem in its valve guide.

2. A device for measuring the wear of a valve guide having a valve stem of a valve, which is disposed in a housing, extending therethrough, said device comprising support means mounted on the valve housing, means movable through the support means to unseat the valve, means pivotally mounted on said support means to move the valve stem laterally in its valve guide, and indicating means mounted on said support means and responsive to the lateral movement of the valve stem in its valve guide by said valve stem moving means to indicate the wobble or play of the valve stem in its valve guide.

3. A device for measuring the wear of a valve guide having a valve stem of a valve, which is disposed in a housing, extending therethrough, said device comprising support means mounted on the valve housing, means mounted in the support means and movable therethrough to unseat the valve, said means being in alignment with the valve stem, means mounted on said support means to move the valve stem laterally in its valve guide, and indicating means mounted on said support means and responsive to the lateral movement of the valve stem in its valve guide by said valve stem moving means to indicate the wobble or play of the valve stem in its valve guide.

4. A device for measuring the wear of a valve guide having a valve stem of a valve, which is disposed in a housing, extending therethrough, said device comprising support means mounted on the valve housing, means mounted in the support means and movable therethrough to unseat the valve, said means being in alignment with the valve stem, a fork member mounted on said support means to move the valve stem laterally in its valve guide, and indicating means mounted on said support means and responsive to the lateral movement of the valve stem in its valve guide by said fork member to indicate the wobble or play of the valve stem in its valve guide.

5. A device for measuring the wear of a valve guide having a valve stem of a valve, which is disposed in a housing, extending therethrough, said device comprising a supporting bracket adapted to be mounted on the housing, means connected to said supporting bracket for securing said supporting bracket to the housing, means on said supporting bracket for unseating the valve; means mounted on said supporting bracket to move the valve stem laterally in the valve guide, and indicating means mounted on said supporting bracket and responsive to the lateral movement of the valve stem in its valve guide by said valve stem moving means to indicate the wobble or play of the valve stem in its valve guide.

6. A device for measuring the wear of a valve guide having a valve stem of a valve, which is disposed in a housing, extending therethrough, said device comprising a supporting bracket having a lateral extension, means to attach said supporting bracket to the housing, means mounted on said supporting bracket to unseat the valve, means mounted on said supporting bracket to rock the valve stem laterally in its valve guide, and indicating means mounted on the lateral extension of the supporting bracket and responsive to the lateral movement of the valve stem in its valve guide by said valve stem moving means to indicate he wobble or play of the valve stem in its valve guide.

7. A device for measuring the wear of a valve guide having a valve stem of a valve, which is disposed in a housing, extending therethrough, said device comprising support means mounted on the valve housing, means on said support means for unseating the valve, means mounted on said support means to move the valve stem laterally in its valve guide, an indicator mounted on said support means, and an arm extending from said indicator for actuating contact with the side of the valve stem to actuate said indicator in response to the lateral movement of the valve stem in its valve guide by said valve stem moving means to indicate the wobble or play of the valve stem in its valve guide.

References Cited in the file of this patent

UNITED STATES PATENTS

| | | |
|---|---|---|
| 1,341,935 | Schustarich | June 1, 1920 |
| 1,839,596 | Rouse | Jan. 5, 1932 |
| 1,888,454 | Edson | Nov. 22, 1932 |
| 1,891,364 | Albertson | Dec. 20, 1932 |
| 1,891,365 | Albertson | Dec. 20, 1932 |
| 2,557,840 | Preslan | June 19, 1951 |
| 2,680,300 | Ruggles | June 8, 1954 |